United States Patent [19]
Rabinovich

[11] Patent Number: 5,810,504
[45] Date of Patent: Sep. 22, 1998

[54] AXIALLY ADJUSTABLE TAP HANDLE ATTACHMENT MECHANISM

[75] Inventor: Rodolfo Eduardo Rabinovich, Berwick, Australia

[73] Assignee: Dorf Industries Pty. Ltd., Oakleigh South Vic, Australia

[21] Appl. No.: 605,110

[22] PCT Filed: Aug. 16, 1994

[86] PCT No.: PCT/AU94/00476

§ 371 Date: Jul. 18, 1996

§ 102(e) Date: Jul. 18, 1996

[87] PCT Pub. No.: WO95/06836

PCT Pub. Date: Mar. 9, 1995

[30]     Foreign Application Priority Data

Sep. 2, 1993 [AU] Australia .............................. PM0968

[51] Int. Cl.⁶ .................................................. F16K 31/60
[52] U.S. Cl. ........................... 403/371; 403/369; 403/365
[58] Field of Search ................................... 403/371, 370, 403/369, 365, 383; 279/87, 59, 58

[56]               References Cited

U.S. PATENT DOCUMENTS

| 524,848 | 8/1894 | Doebler | 403/370 X |
|---|---|---|---|
| 1,217,132 | 2/1917 | Amos | 403/370 X |
| 1,856,845 | 5/1932 | Donahue . | |
| 2,023,951 | 12/1935 | Cohan . | |
| 4,287,785 | 9/1981 | Hunt | 403/371 X |
| 5,025,826 | 6/1991 | Schoepe et al. . | |
| 5,176,464 | 1/1993 | Tanner | 402/371 X |
| 5,474,403 | 12/1995 | Hetrich | 403/370 X |

FOREIGN PATENT DOCUMENTS

| 240599 | 8/1961 | Australia . |
|---|---|---|
| 57370/60 | 1/1963 | Australia . |
| 62451/73 | 5/1975 | Australia . |
| 24059/77 | 10/1977 | Australia . |
| 50406/79 | 3/1980 | Australia . |
| 3143747 | 5/1983 | Germany . |
| 2063426 | 6/1981 | United Kingdom . |
| 2222661 | 3/1990 | United Kingdom . |

Primary Examiner—Anthony Knight
Attorney, Agent, or Firm—Fish & Richardson, P.C.

[57]               ABSTRACT

A tap handle contains an attachment assembly to adjustably attach the handle to a tap spindle over a range of different axial positions relative to a closure member sealing an opening in a wall. The attachment assembly includes a locating member axially slidable within a bore of the handle to rotatably engage the spindle and a locking member which cooperates with the locating member to lock the locating member at a preselected axial position.

1 Claim, 2 Drawing Sheets

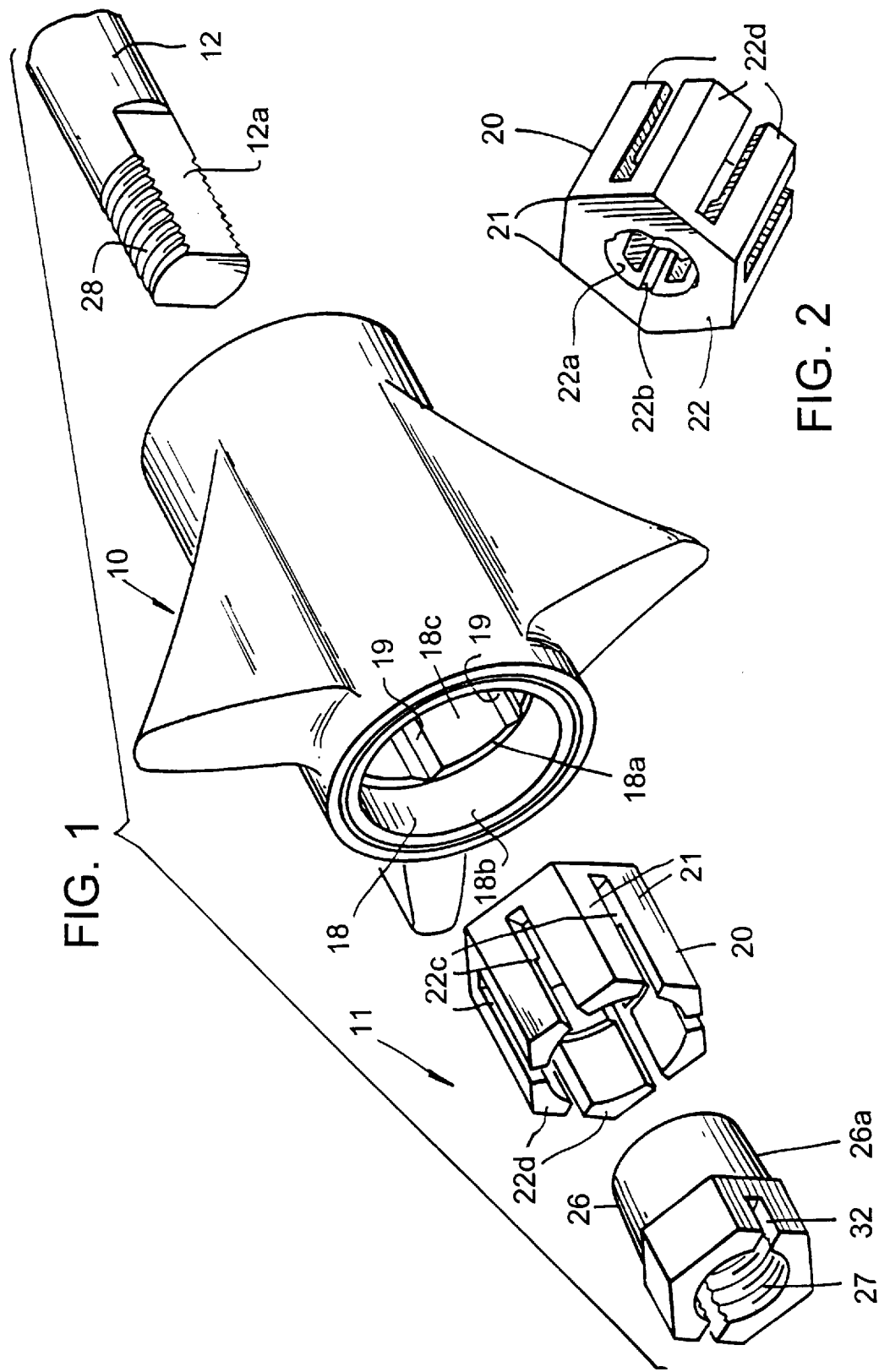

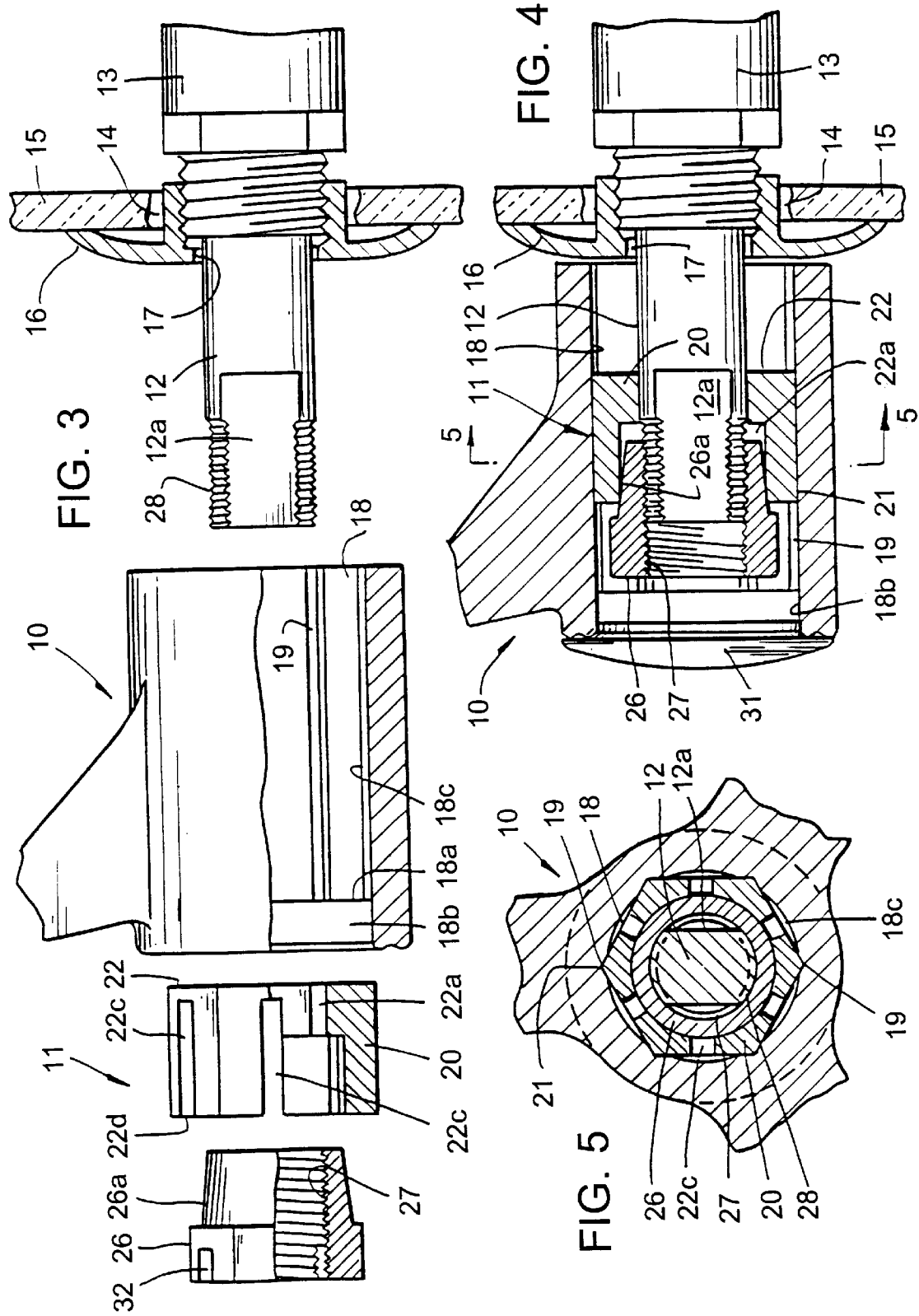

AXIALLY ADJUSTABLE TAP HANDLE ATTACHMENT MECHANISM

TECHNICAL FIELD

This invention relates to an adjustable attachment between a tap handle and a tap spindle which enables the axial position of the handle on the spindle to be adjusted where necessary.

BACKGROUND ART

It is conventional with existing handle attachments that the position of the handle is predetermined with no provision to allow adjustment of its axial position on the spindle. As a result when tap mechanisms are situated behind walls and bench tops, with the tap spindle extending through an opening in the wall or bench top, there is no provision to deal with differing thicknesses of walls or bench tops, particularly with regard to varying thicknesses of tiles applied to the wall or bench top which can vary from one tile manufacturer to another. Historically European manufactured tiles, particularly of Italian origin, are thicker than tiles originating elsewhere. In addition materials used for walls and bench tops can vary in thickness. However, for aesthetic reasons it is desirable that the position of the handle reside close to the cover plate or flange surrounding the tap spindle. The cover plate or flange covers the opening through the wall or bench top and is screwed onto the stuffing box of the tap assembly. The handle when positioned in some applications in required to hide the tap spindle or at least minimise the amount thereof which is visible when the tap is in the closed or off condition. In other applications, where the spindle is to be exposed, axial adjustment can still be required for various reasons.

It is therefore an object of the present invention to provide an attachment between a tap handle and a tap spindle which will allow adjustment of the axial position of the tap handle relative to the spindle whereby to avoid or at least minimize the above problems with conventional attachments.

DISCLOSURE OF THE INVENTION

In accordance with the invention there is envisaged a tap handle containing means to attach the handle to a tap spindle, wherein the means for attaching the handle to the tap spindle consists of a locating member adapted to rotatably engage the spindle as well as an aperture within and through said handle, and a locking member to hold said locating member at a fixed axial position relative to said aperture within and through said handle, wherein said locating member has an axial passage therethrough and has an end wall with an axial aperture therethrough shaped to drivingly receive an end of said spindle as well as a plurality of longitudinally extending fingers extending from said end wall with a limited degree of flexibility, and wherein said locking member is adapted to be received within said passage of said locating member has a tapering external configuration which engages within the hollow locating member to progressively flex said fingers thereof outwardly into tight engagement with the aperture within and through said handle.

BEST MODE FOR CARRYING OUT THE INVENTION

One preferred embodiment of the invention will now be described with reference to the accompanying drawings, in which:

FIG. 1 is an exploded perspective view of an tap handle including an adjustable attachment in accordance with the preferred embodiment of the invention, FIG. 2 is a perspective view from the opposite end of one of the components of the handle of FIG. 1, FIG. 3 is a partially sectioned exploded longitudinal view of the handle of FIG. 1 and associated tap spindle, FIG. 4 is a longitudinal cross-sectional view of the tap/spindle of FIG. 3 in an assembled condition, and FIG. 5 is cross-sectional view taken along line 5—5 of FIG. 4.

Referring to the drawings, there is shown a tap handle 10 incorporating a spindle attachment assembly generally indicated as 11, a tap spindle 12 extending from within the outermost stuffing box 13 of the tap assembly, and through an intervening opening 14 through a wall or bench top 15. The opening is closed by a closure member or flange 16 having an opening 17 therethrough receiving and surrounding the tap spindle.

The tap spindle 12 has a pair of diametrically opposed flats 12a machined thereon which, with conventional handle attachments, allow the handle to rotatably engage the tap spindle to enable opening and closing of the associated tap mechanism through the stuffing box 13.

The tap handle 10 has an axial bore 18 therethrough which is stepped at 18a to provide a larger portion 18b adjacent one end of the bore and a reduced diameter portion 18c extending along the remainder of the bore, with the bore adapted to co-axially surround the tap spindle 12 but spaced therefrom. The reduced diameter portion 18c of axial bore 18 has longitudinally axially extending grooves 19 formed therein at circumferentially spaced positions around the bore to form part of a splined connection to be later described.

The spindle attachment assembly 11 consists of locating member 20 of suitable external cross-section, such as a hexagonal external cross-section as shown, and the corners 21 of which engage the grooves 19 in the axial bore 18 through the tap handle, and has an end wall 22 with a central axial hole 22a therethrough with opposed flats 22b machined therein to engage and mate with the flats 12a on the tap spindle. The opposite end of the locating member 20 is open and each of the six flat walls of the member, in the case of a hexagonal member, are slotted at 22c from the open end to the end wall 22 to provide six fingers 22d each of which has a limited degree of flexibility.

The attachment assembly is completed by a locking member 26 having an axial hole 27 therethrough which is internally threaded to engage an externally threaded end portion 28 of the tap spindle 12, and axially moveable within the locating member as the locking member is screwed into position. The circumferential surface of the locking member 26 is slightly tapered at 26a and of such a tapering diameter that, when being screwed into position, it will flex the fingers 22d of the locating member outwardly into tight engagement with the inside of the bore 18 through the handle, whereby to fasten the handle to the spindle via the locating member 20.

As shown in FIG. 4, the outer end of the bore 18 through the tap handle is closed by a closure button 31 which may carry reference to whether the associated tap mechanism controls hot or cold water and also possibly other indicia identifying the manufacturers name and/or a relevant trade mark.

During assembly of the tap mechanism and associated tap handle, the tap assembly is positioned as normal behind the wall, or beneath the bench top, with the spindle 12 extending through the opening 14 whereafter the closure member or flange 16 is positioned to close the opening 14. The locating member 20 is then placed onto the tap spindle with the flats 12*a* and 22*b* in engagement. The tap handle is then moved axially onto the locating member (with the tap mechanism in the closed or off position) until a required distance between the tap handle and the closure member or flange 16 is achieved in accordance with the aesthetics referred to previously. The locking member 26 is screwed into position on the tap spindle and inside the locating member 20 to flax the fingers 22*d* outwardly into tight engagement with the bore 18 through the handle to in effect lock the spindle attachment assembly in position and therefore hold the handle at the chosen axial position on the spindle. For the purpose of screwing the locking member 26 in position, opposed, radially extending, grooves 32 may be provided on the outer face of the locking member 26 for engagement by a screw driver or other appropriate tool.

The closure button 31 is then screwed, glued, or snap fitted into position to close the outer end of the axial bore 18 through the tap handle 10.

I claim:

1. A tap handle containing means to attach the handle to a tap spindle, wherein the means for attaching the handle to the tap spindle consists of a locating member adapted to rotatable engage the spindle as well as an aperture within and through said handle, and a locking member to hold said locating member at a selected axial position relative to said aperture within and through said handle, wherein said locating member has an axial passage therethrough and has an end wall with an axial aperture therethrough shaped to drivingly receive an end of said spindle as well as a plurality of longitudinally extending fingers extending from said end wall with a limited degree of flexibility, and wherein said locking member is adapted to be received within said passage of said locating member and has a tapering external configuration which engages within the hollow locating member to progressively flex said fingers thereof outwardly into tight engagement with the aperture within and through said handle, said fingers of said locating member being so shaped as to mate with at least part of the internal cross-section of the aperture through said handle to transmit rotation of said handle to said tap spindle, and the end of said tap spindle being screw threaded and the locking member being correspondingly internally screw threaded, whereby insertion of said locking member within said locating member by progressive screwing of said locking member onto said spindle received within said locating member flexes said fingers outwardly into tight engagement with the aperture within and through said handle.

* * * * *